(12) United States Patent
Sakai (10) Patent No.: US 7,330,296 B2
(45) Date of Patent: Feb. 12, 2008

(54) SYNCHRONOUS DETECTOR, OPTICAL SCANNER, AND IMAGE FORMING APPARATUS

(75) Inventor: Kohji Sakai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 650 days.

(21) Appl. No.: 10/758,212

(22) Filed: Jan. 16, 2004

(65) Prior Publication Data

US 2004/0196507 A1 Oct. 7, 2004

(30) Foreign Application Priority Data

Jan. 16, 2003 (JP) .............................. 2003-008891

(51) Int. Cl.
*G02B 26/08* (2006.01)
(52) U.S. Cl. ...................... 359/212; 347/250
(58) Field of Classification Search ................. None
See application file for complete search history.

(56) References Cited

U.S. PATENT DOCUMENTS

| | | | | |
|---|---|---|---|---|
| 4,130,339 | A * | 12/1978 | Kawamura et al. | ......... 359/218 |
| 4,307,408 | A * | 12/1981 | Kiyohara et al. | ............ 347/255 |
| 5,999,345 | A | 12/1999 | Nakajima et al. | |
| 6,166,842 | A | 12/2000 | Aoki et al. | |
| 6,256,133 | B1 | 7/2001 | Suzuki et al. | |
| 6,347,004 | B1 | 2/2002 | Suzuki et al. | |
| 6,348,989 | B2 | 2/2002 | Aoki et al. | |
| 6,359,717 | B2 | 3/2002 | Suzuki et al. | |
| 6,366,384 | B1 | 4/2002 | Aoki et al. | |
| 6,388,792 | B1 | 5/2002 | Atsuumi et al. | |
| 6,448,998 | B1 | 9/2002 | Suzuki et al. | |
| 6,509,995 | B1 | 1/2003 | Suzuki et al. | |
| 6,596,985 | B2 | 7/2003 | Sakai et al. | |
| 6,606,179 | B2 | 8/2003 | Suzuki et al. | |
| 6,813,052 | B2 * | 11/2004 | Yoshizawa | .................. 359/216 |
| 2003/0043442 | A1 * | 3/2003 | Ishihara et al. | ............. 359/205 |
| 2004/0196507 | A1 | 10/2004 | Sakai | |

FOREIGN PATENT DOCUMENTS

JP 05-150176 6/1993

(Continued)

OTHER PUBLICATIONS

U.S. Appl. No. 09/955,181, filed Sep. 19, 2001, Suzuki et al.

(Continued)

*Primary Examiner*—James Phan
(74) *Attorney, Agent, or Firm*—Oblon, Spivak, McClelland, Maier & Neustadt, P.C.

(57) ABSTRACT

A synchronous detector detects timing of scanning by an optical scanner in an image forming apparatus. The optical scanner has a light source that emits a light beam, a deflecting unit that deflects the light beam, a scanning optical element that focuses the light beam deflected by the deflecting unit onto a surface to be scanned. The synchronous detector includes a photoreceiver, and a synchronous optical element that focus the light beam deflected by the deflecting unit onto the photoreceiver. The synchronous optical element satisfies a relationship fm<fd, where fm is a composite focal length of the scanning optical element in a main scanning direction, and fd is a composite focal length of the synchronous optical element in the main scanning direction.

9 Claims, 11 Drawing Sheets

FOREIGN PATENT DOCUMENTS

| | | |
|---|---|---|
| JP | 07-281113 | 10/1995 |
| JP | 2001-281571 | 10/2001 |
| JP | 3236017 | 12/2001 |

OTHER PUBLICATIONS

U.S. Appl. No. 09/678,611, filed Oct. 4, 2000, Sakai et al.
U.S. Appl. No. 10/207,241, filed Jul. 30, 2002, Suzuki et al.
U.S. Appl. No. 10/247,702, filed Sep. 20, 2002, Hayashi et al.
U.S. Appl. No. 10/278,810, filed Oct. 24, 2002, Suzuki et al.
U.S. Appl. No. 10/382,489, filed Mar. 7, 2003, Takanashi et al.
U.S. Appl. No. 10/391,580, filed Mar. 20, 2003, Sakai.
U.S. Appl. No. 10/438,065, filed May 15, 2003, Sakai et al.
U.S. Appl. No. 10/460,410, filed Jun. 13, 2003, Sakai et al.
U.S. Appl. No. 10/758,212, filed Jan. 16, 2004, Sakai.
U.S. Appl. No. 10/984,930, filed Nov. 10, 2004, Sakaue et al.

* cited by examiner

CYLINDRICAL SURFACE

CYLINDRICAL SURFACE

FIG.9

CYLINDRICAL SURFACE    SPHERICAL SURFACE

SYNCHRONOUS DETECTOR, OPTICAL SCANNER, AND IMAGE FORMING APPARATUS

CROSS-REFERENCE TO RELATED APPLICATIONS

The present document incorporates by reference the entire contents of Japanese priority document, 2003-008891 filed in Japan on Jan. 16, 2003.

BACKGROUND OF THE INVENTION

1) Field of the Invention

The present invention relates to an optical scanner used in an image forming apparatus, and more specifically to a synchronous detector for deciding start of writing in the optical scanner.

2) Description of the Related Art

Optical scanners are widely known and used as writing apparatuses in image forming apparatuses such as digital copiers, optical printers, photolithographic apparatuses, and facsimile apparatuses.

With such an optical scanner, for the purpose of detecting a position or a timing to start writing an image on the surface to be scanned, a photoreceiver is disposed at the position to start writing the image on the scanned surface or a position equivalent thereto either directly or via a slit or the like. As a result, at the moment the light beam passes the position in which the photoreceiver has been disposed the photoreceiver outputs a start writing image signal, and writing is started. The arrangement for detecting the position or the timing to start writing is called as a synchronous detector.

For example, the art described in Japanese Patent No. 3236017, Japanese Patent Application Laid-open No. 5-150176, and Japanese Patent Application Laid-open No. 7-281113 relates to a type in which an optical element having positive power is disposed upstream of the photoreceiver, and the art described in Japanese Patent Application Laid-open No. 2001-281571 relates to a type in which an optical element is not disposed upstream of the photoreceiver.

If the synchronous detector detects a wrong timing to start writing, the error is magnified with regard to the shift in the position of the light beam spot on the surface to be scanned, and cause color blurring. In particular, this effect becomes pronounced in the case of a synchronous detector in which an optical element having positive power is disposed upstream of the photoreceiver.

SUMMARY OF THE INVENTION

It is an object of the present invention to solve at least the problems in the conventional technology.

A synchronous detector according to one aspect of the present invention detects timing of scanning by an optical scanner. The optical scanner has a light source that emits a light beam, a deflecting unit that deflects the light beam, a scanning optical element that focuses the light beam deflected by the deflecting unit onto a surface to be scanned. The synchronous detector includes a photoreceiver and a synchronous optical element that focus the light beam deflected by the deflecting unit onto the photoreceiver. The synchronous optical element satisfies a relationship fm<fd, where fm is a composite focal length of the scanning optical element in a main scanning direction, and fd is a composite focal length of the synchronous optical element in the main scanning direction.

An optical scanner according to another aspect of the present invention includes a light source that emits a light beam; a deflecting unit that deflects the light beam; a scanning optical element that focuses the light beam deflected by the deflecting unit onto a surface to be scanned; and a synchronous detector that detects timing of scanning by an optical scanner. The synchronous detector includes a photoreceiver and a synchronous optical element that focus the light beam deflected by the deflecting unit onto the photoreceiver. The synchronous optical element satisfies a relationship fm<fd, where fm is a composite focal length of the scanning optical element in a main scanning direction, and fd is a composite focal length of the synchronous optical element in the main scanning direction.

An image forming apparatus according to still another aspect of the present invention includes a photoreceptor, an optical scanner that optically scans a surface of the photoreceptor, and a synchronous detector that detects timing of scanning of the photoreceptor by the optical scanner. The the optical scanner includes a light source that emits a light beam; a deflecting unit that deflects the light beam; and a scanning optical element that focuses the light beam deflected by the deflecting unit onto a surface to be scanned. The synchronous detector includes a photoreceiver and a synchronous optical element that focus the light beam deflected by the deflecting unit onto the photoreceiver. The synchronous optical element satisfies a relationship fm<fd, where fm is a composite focal length of the scanning optical element in a main scanning direction, and fd is a composite focal length of the synchronous optical element in the main scanning direction.

The other objects, features and advantages of the present invention are specifically set forth in or will become apparent from the following detailed descriptions of the invention when read in conjunction with the accompanying drawings.

DETAILED DESCRIPTION

Exemplary embodiments of a synchronous detector, an optical scanner, and an image forming apparatus according to the present invention will be explained below while referring to the accompanying drawings.

Figure 1:
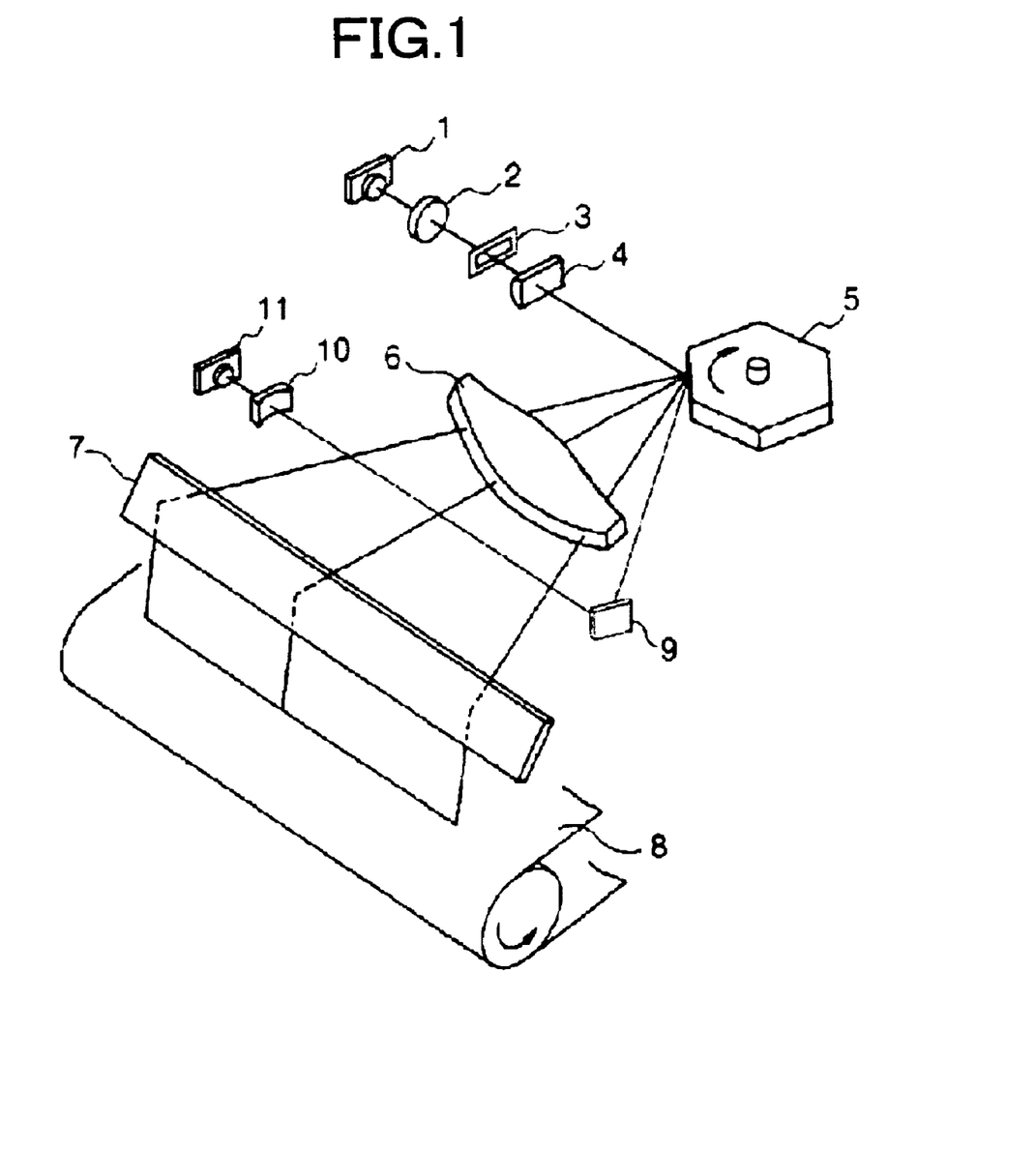
FIG. 1 is a perspective view of an optical scanner according to a first embodiment of the present invention.

FIG. 1 is a perspective view of an optical scanner according to a first embodiment of the present invention. A light source 1, which is a semiconductor laser, emits a divergent light beam. A coupling lens 2 couples this light beam to a subsequent optical system. The coupled light beam may be made to be a weakly divergent or weakly convergent light beam, or a parallel light beam, in accordance with the optical properties of the subsequent optical system.

The light beam then passes through an aperture 3 in a plate. When the light beam then passes through an aperture 3, a peripheral part of the light beam is blocked by the plate and hence the light beam is shaped in the form of the aperture. Then the light beam enters a cylindrical lens 4, which is a linear image forming optical system. The cylindrical lens 4 is orientated in such a manner that, a side that has no power of the cylindrical lens 4 is orientated in the main scanning direction and a side that has positive power is orientated in the secondary scanning direction. Hence, the cylindrical lens 4 converges the incident light beam in the secondary scanning direction, and focuses the light beam on a deflecting reflecting surface of a polygonal mirror 5, which is an optical deflector.

The polygonal mirror 5 is rotated at constant speed. Therefore, the light beam is reflected by the deflecting reflecting surface and also deflected at constant angular speed, and passes through a scanning lens 6 which constitutes a scanning optical system. A bending mirror 7 then bends the light beam to focus the light beam as a light line onto a photoconductive photoreceptor 8, which is the object to be scanned. Because the photoconductive photoreceptor 8 rotates, the surface of the photoconductive photoreceptor 8 is optically scanned by the light line.

While the polygonal mirror 5 rotates, the light beam first of all falls on a mirror 9 before falling on the scanning lens. The mirror 9 reflects the light beam towards a photoreceiver 11 via a lens 10, which is a cylindrical lens. The photoreceiver 11 outputs a signal as the light beam falls on it. Thus, when the photoreceiver 11 outputs a signal, that timing is taken as a start writing timing for the optical scanning.

Thus, the light beam does not pass through the scanning lens 6 before falling on the mirror 9. Moreover, the lens 10, which is made of glass or plastic, has negative power in the main scanning direction.

A lens having a focal length fm of 185.3 millimeter (mm) in the main scanning direction was used as the scanning lens 6, and a lens having a focal length fd of 246.4 mm in the main scanning direction was used as the lens 10.

In this case, the extent of the effect of an error in the synchronous detector on the light beam spot on the scanned surface is 185.3/246.4=0.75, i.e. there is a reduction down to approximately ¾, and hence even if there is an error in the synchronous detector, the shift in the position of the light beam spot can be minimized.

Figure 2:
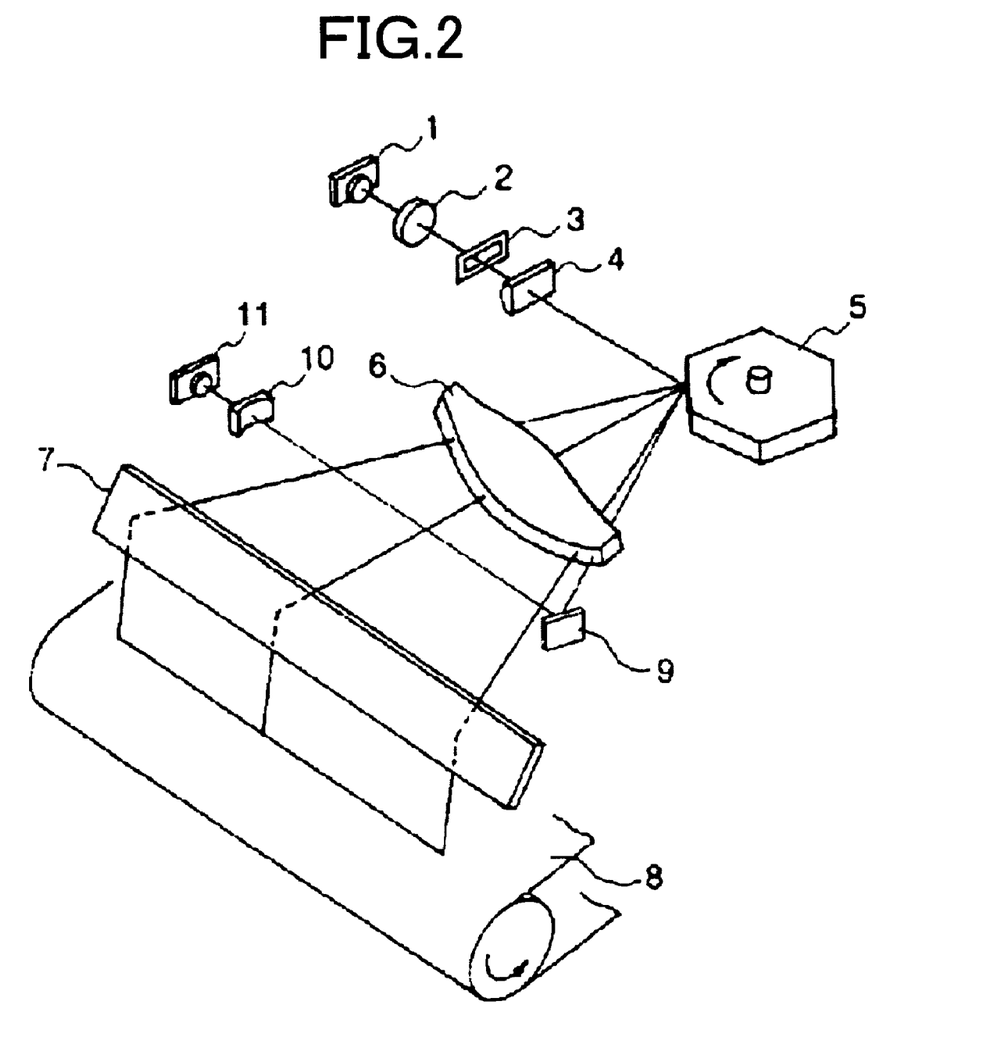
FIG. 2 is a perspective view of an optical scanner according to a second embodiment of the present invention.

FIG. 2 is a perspective view of an optical scanner according to a second embodiment of the present invention. In FIG. 2, to keep matters simple, so long as there is no risk of confusion, constituent elements corresponding to ones in FIG. 1 will be given the same reference numeral as in FIG. 1.

Figure 7:
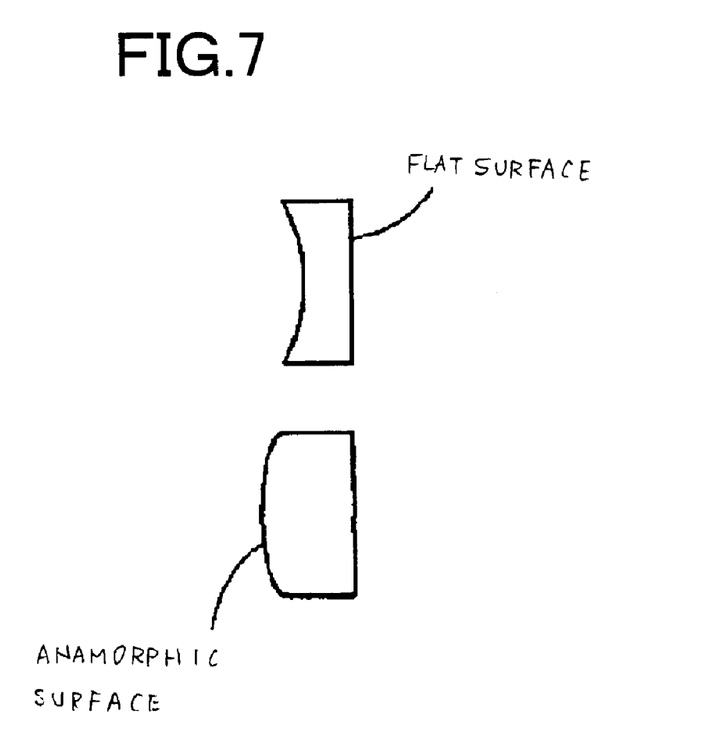
FIG. 7 illustrates sectional views of a lens having negative power in both the main scanning direction and the secondary scanning direction.

The optical scanner according to the second embodiment differs to the optical scanner according to the first embodiment in that the light beam passes through the scanning lens 6 before falling on the mirror 9. Moreover, the lens 10 is an anamorphic lens that has negative power in both the main scanning direction and the secondary scanning direction. Cross sectional views of such a lens are shown in FIG. 7.

A lens having a focal length fm of 185.3 mm in the main scanning direction was used as the scanning lens 6, and a lens such that a composite focal length fd of the scanning lens 6 and the lens 10 in the main scanning direction is 246.4 mm was used as the lens 10. In this case, the extent of the effect of an error in the synchronous detector on the light beam spot on the scanned surface is 185.3/246.4=0.75, i.e. there is a reduction down to approximately ¾, and hence even if there is an error in the synchronous detector, the shift in the position of the light beam spot can be minimized.

Figure 3:
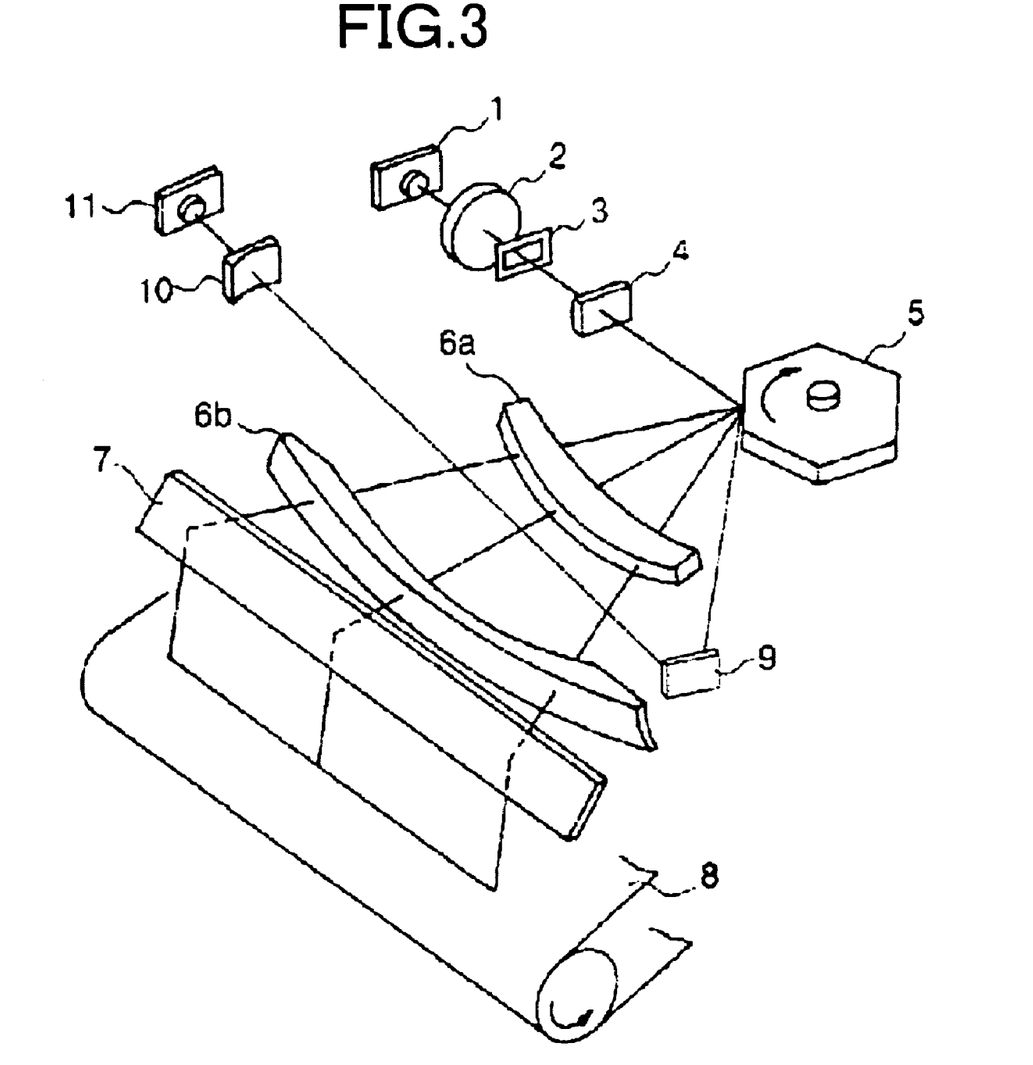
FIG. 3 is a perspective view of an optical scanner according to a third embodiment of the present invention.

FIG. 3 is a perspective view of an optical scanner according to a third embodiment of the present invention. In FIG. 3, to keep matters simple, so long as there is no risk of confusion, constituent elements corresponding to ones in FIG. 1 will be given the same reference numeral as in FIG. 1.

Figure 8:
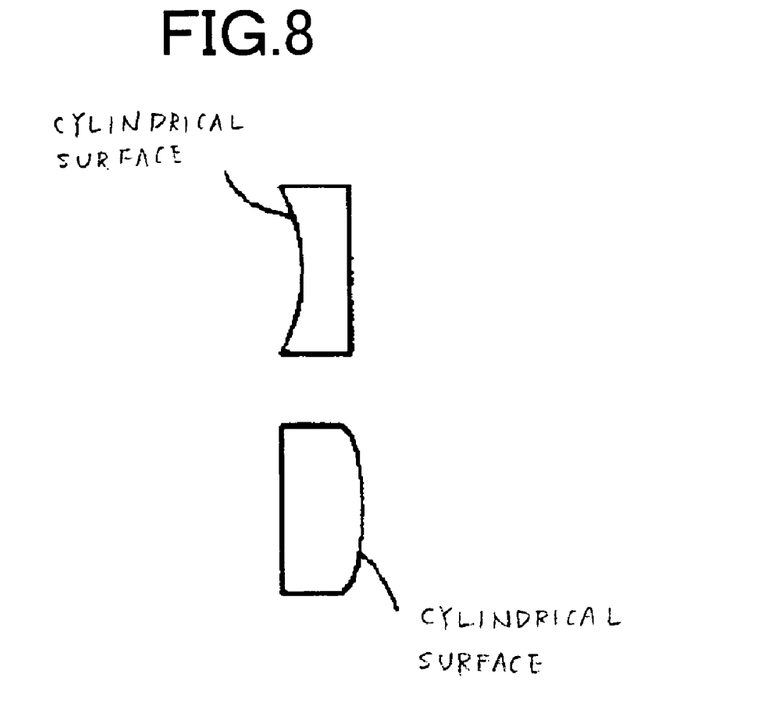
FIG. 8 illustrates sectional views of a lens having a combination of a cylindrical surface having negative power in the main scanning direction and a cylindrical surface having negative power in the secondary scanning direction.

The optical scanner according to the third embodiment differs to the optical scanner according to the first embodiment in that the scanning optical system includes two scanning lenses: a lens 6a and a lens 6b. Moreover, the lens 10 is an anamorphic lens that has a combination of a cylindrical surface having negative power in the main scanning direction and a cylindrical surface having negative power in the secondary scanning direction. Cross sectional views of such a lens are shown in FIG. 8.

Lenses having a composite focal length fm of 227.9 mm in the main scanning direction were used as the scanning lenses 6a and 6b. A lens having a focal length fd of 350 mm in the main scanning direction was used as the lens 10. In this case, the extent of the effect of an error in the synchronous detector on the light beam spot on the scanned surface is 227.9/350=0.65, i.e. there is a reduction down to approximately ⅗, and hence even if there is an error in the synchronous detector, the shift in the position of the light beam spot can be minimized.

Figure 4:
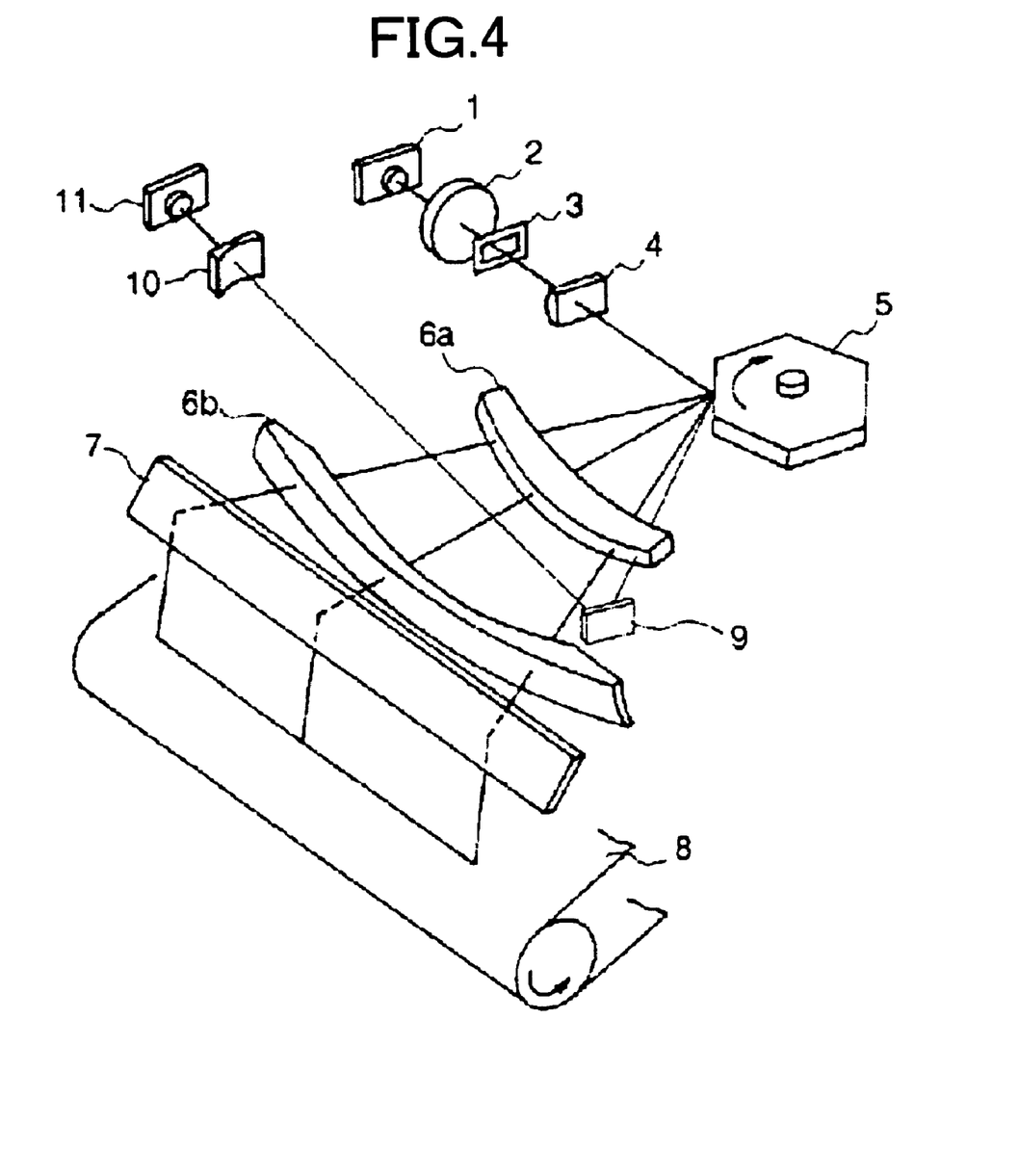
FIG. 4 is a perspective view of an optical scanner according to a fourth embodiment of the present invention.

FIG. 4 is a perspective view of an optical scanner according to a fourth embodiment of the present invention. In FIG. 4, to keep matters simple, so long as there is no risk of confusion, constituent elements corresponding to ones in FIG. 3 will be given the same reference numeral as in FIG. 3.

Figure 9:
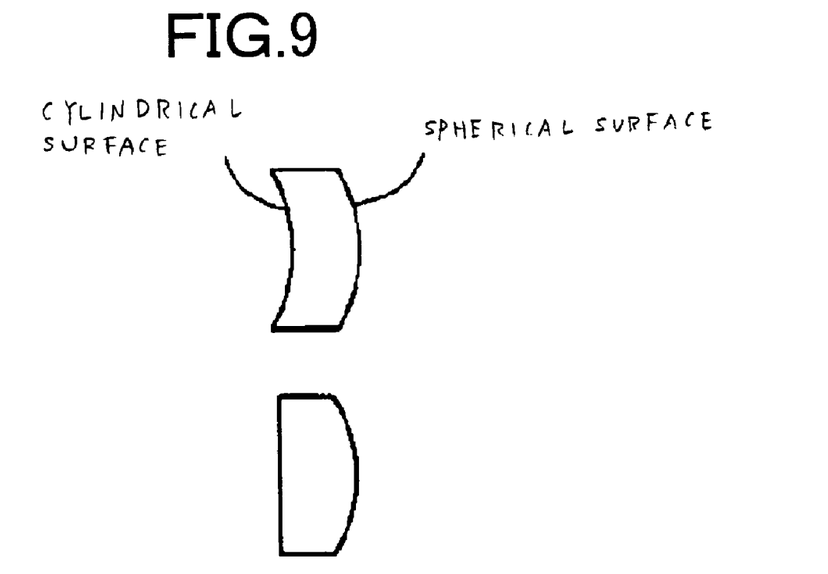
FIG. 9 illustrates sectional views of a lens having one surface is a cylindrical surface that is concave in the main scanning direction and the other surface is a spherical surface.

The optical scanner according to the fourth embodiment differs to the optical scanner according to the third embodiment in that the light beam passes through the scanning lens 6a before falling on the mirror 9. Moreover, the lens 10 is an anamorphic lens constituted such that one surface is a cylindrical surface that is concave in the main scanning direction and the other surface is a spherical surface. Cross sectional views of such a lens are shown in FIG. 9.

Lenses having a composite focal length fm of 227.9 mm in the main scanning direction were used as the scanning lenses 6a and 6b. A lens such that the composite focal length fd of the scanning lens 6a and the lens 10 in the main scanning direction is 350 mm was used as the lens 10. In this case, the extent of the effect of an error in the synchronous detector on the light beam spot on the scanned surface is 227.9/350=0.65, i.e. there is a reduction down to approximately ⅗, and hence even if there is an error in the synchronous detector, the shift in the position of the light beam spot can be minimized.

Figure 5:
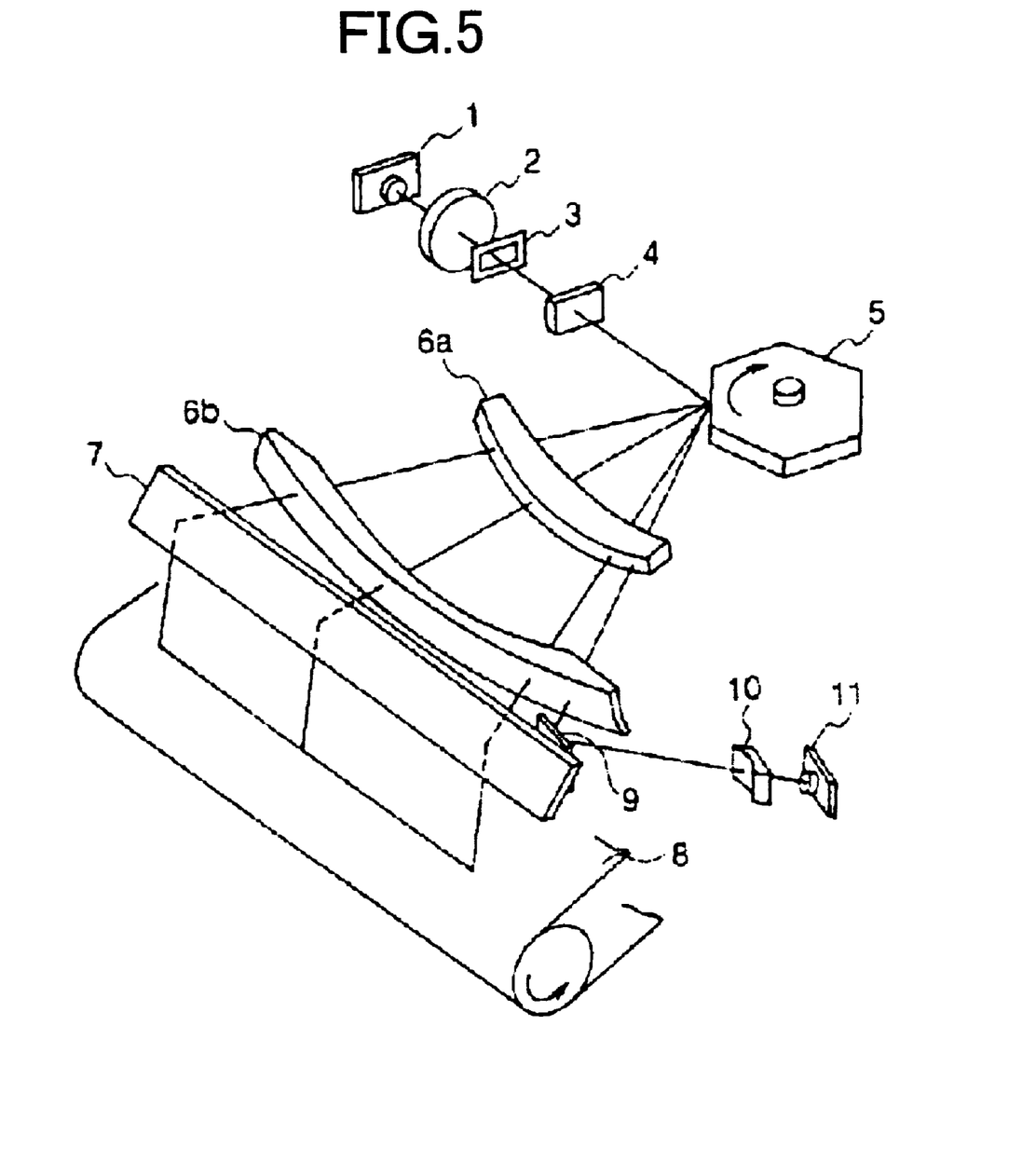
FIG. 5 is a perspective view of an optical scanner according to a fifth embodiment of the present invention.
Figure 6:
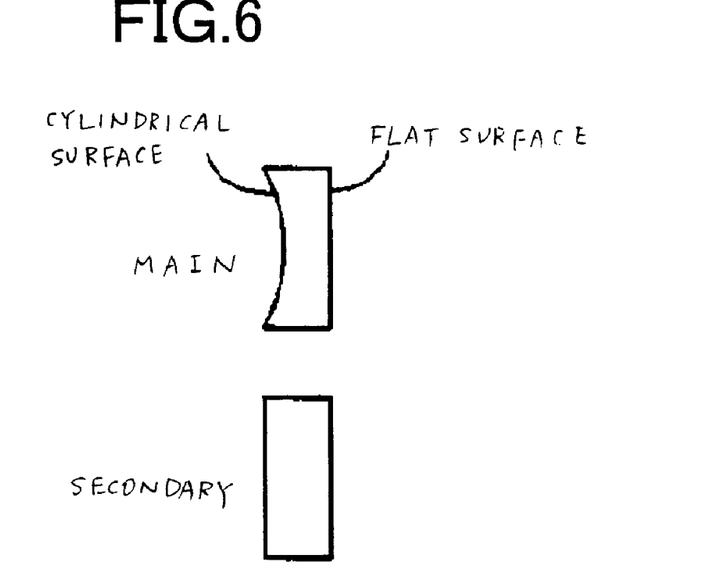
FIG. 6 illustrates sectional views of a lens having negative power in the main scanning direction.

FIG. 5 is a perspective view of an optical scanner according to a fifth embodiment of the present invention. In FIG. 5, to keep matters simple, so long as there is no risk of confusion, constituent elements corresponding to ones in FIG. 3 will be given the same reference numeral as in FIG. 3.

The optical scanner according to the fifth embodiment differs to the optical scanner according to the fourth embodiment in that the light beam passes through the lenses 6a and 6b before falling on the mirror 9. In other words, the mirror 9 is positioned downstream of the scanning lens 6b. The lens 10 is same as that in the fourth embodiment.

Lenses having a composite focal length fm of 227.9 mm in the main scanning direction were used as the scanning lenses 6a and 6B. A lens such that the composite focal length fd of the scanning lens 6a, the scanning lens 6b, and the lens 10 in the main scanning direction is 350 mm was used as the lens 10. In this case, the extent of the effect of an error in the synchronous detector on the light beam spot on the scanned surface is 227.9/350=0.65, i.e. there is a reduction down to approximately ⅗, and hence even if there is an error in the synchronous detector, the shift in the position of the light beam spot can be minimized.

Figure 10:
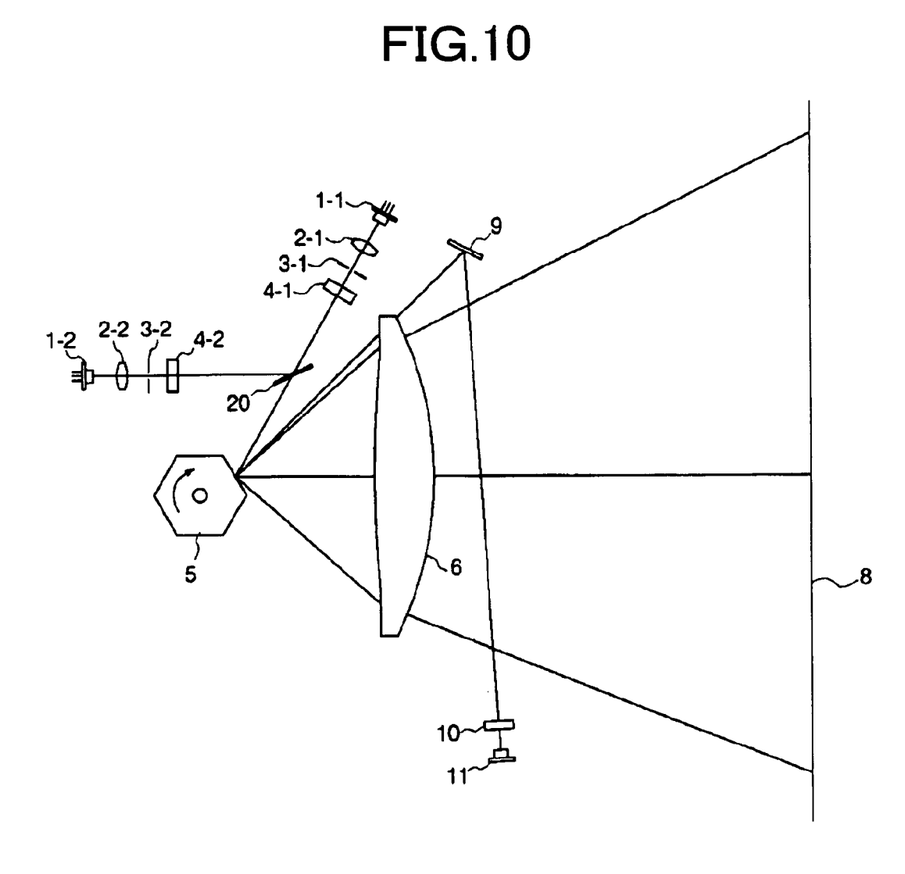
FIG. 10 is a plan view of an optical scanner according to a sixth embodiment of the present invention.

FIG. 10 is a plan view of an optical scanner according to a sixth embodiment of the present invention. In FIG. 10, to keep matters simple, so long as there is no risk of confusion, constituent elements corresponding to ones in FIG. 1 will be given the same reference numeral as in FIG. 1.

Figure 11:
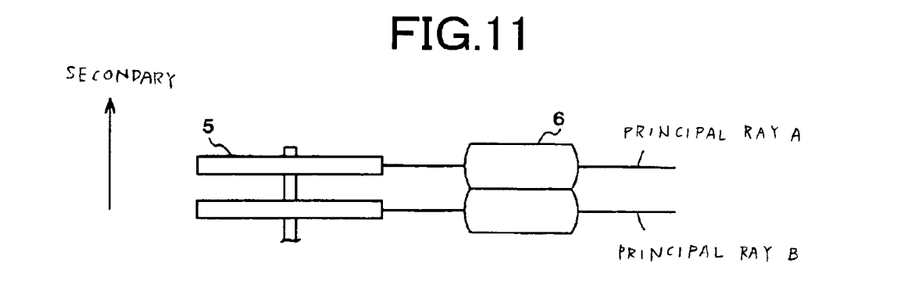
FIG. 11 is a schematic view of an optical scanner according to still another embodiment of the present invention in which polygonal mirrors and scanning lenses are provided in two tiers.

In the optical scanner according to a sixth embodiment, as shown in FIG. 11, the polygonal mirror 5 has a form in which two polygonal mirrors are placed on top of one another and linked together in the secondary scanning direction; moreover, the scanning lens 6 has a form in which identical optical surfaces are formed on top of one another in two tiers. In other words, at least one of the optical elements has a form in which identical optical surfaces are formed on top of one another in a plurality of tiers.

A light source 1-1, which is a semiconductor laser, emits a divergent light beam. A coupling lens 2-1 couples this light beam to a subsequent optical system. The coupled light beam may be made to be a weakly divergent or weakly convergent light beam, or a parallel light beam, in accordance with the optical properties of the subsequent optical system.

The light beam then passes through an aperture 3-1 in a plate. When the light beam then passes through an aperture 3-2, a peripheral part of the light beam is blocked by the plate and hence the light beam is shaped in the form of the aperture. Then the light beam enters a cylindrical lens 4-1, which is a linear image forming optical system. The cylindrical lens 4-1 is orientated in such a manner that, a side that has no power is orientated in the main scanning direction, and a side that has positive power is orientated in the secondary scanning direction. Hence the cylindrical lens 4-1 converges the incident light beam in the secondary scanning direction, and focuses the light beam on a deflecting reflecting surface of the upper tier of the polygonal mirror 5, which is an optical deflector.

On the other hand, a light source 1-2 emits a divergent light beam. A coupling lens 2-2 couples this light beam to a subsequent optical system. The coupled light beam may be made to be a weakly divergent or weakly convergent light beam, or a parallel light beam, in accordance with the optical properties of the subsequent optical system.

The light beam then passes through an aperture 3-2 in a plate. When the light beam then passes through an aperture 3-2, a peripheral part of the light beam is blocked by the plate and hence the light beam is shaped in the form of the aperture. Then the light beam enters a cylindrical lens 4-2, which is a linear image forming optical system. The cylindrical lens 4-2 is orientated in such a manner that, a side that has no power is orientated in the main scanning direction, and a side that has positive power is orientated in the secondary scanning direction. Hence the cylindrical lens 4-2 converges the incident light beam in the secondary scanning direction, and focuses the light beam on a deflecting reflecting surface of the lower tier of the polygonal mirror 5, which is an optical deflector.

The two light beams reflected by the deflecting reflecting surfaces are deflected with constant angular speed as the polygonal mirror 5 is rotated at constant speed, and pass through the upper tier and the lower tier respectively of the single lens 6 which constitutes a scanning optical system, and then the optical paths are bent by respective bending mirrors (not shown), and the light beams are focused as light lines onto respective photoconductive photoreceptors (not shown) that constitute the substance of a scanned surface, whereby the scanned surface is optically scanned. Moreover, before the optical scanning, the two light beams are made to strike the mirror 9, and are focused onto the photoreceiver 11 by the lens 10. The start writing timing for the optical scanning is determined based on the output of the photoreceiver 11.

Figure 15:
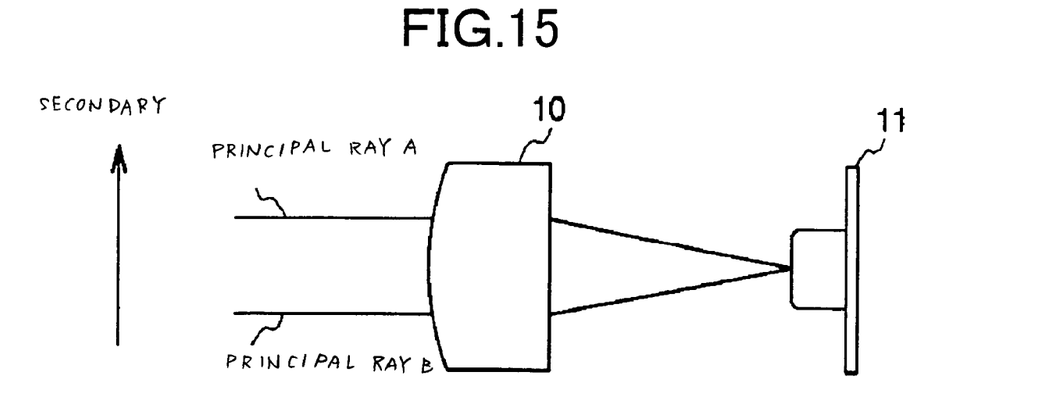
FIG. 15 is for explaining the necessity of light beams in an apparatus according to the present invention being focused to a single point in the secondary scanning direction at a photoreceiver.

Thus, the light beams pass through the scanning lens 6 before falling on the mirror 9. Moreover, the lens 10 is an anamorphic lens constituted such that one surface is a cylindrical surface having a shape that is concave in the main scanning direction and the other surface is a spherical surface as shown in FIG. 9. The radius of curvature of the spherical surface of the lens 10 is set such that the principal rays of the two light beams are focused to a single point in the secondary scanning direction at the photoreceiver 11 (see FIG. 15), whereby the size of the photoreceiver 11 in the secondary scanning direction can be minimized. Moreover, the radius of curvature of the cylindrical surface is set such that the relationship between fm and fd becomes fm<fd, whereby even if there is an error in the synchronous detector, the shift in the position of the light beam spots can be minimized.

Figure 12:
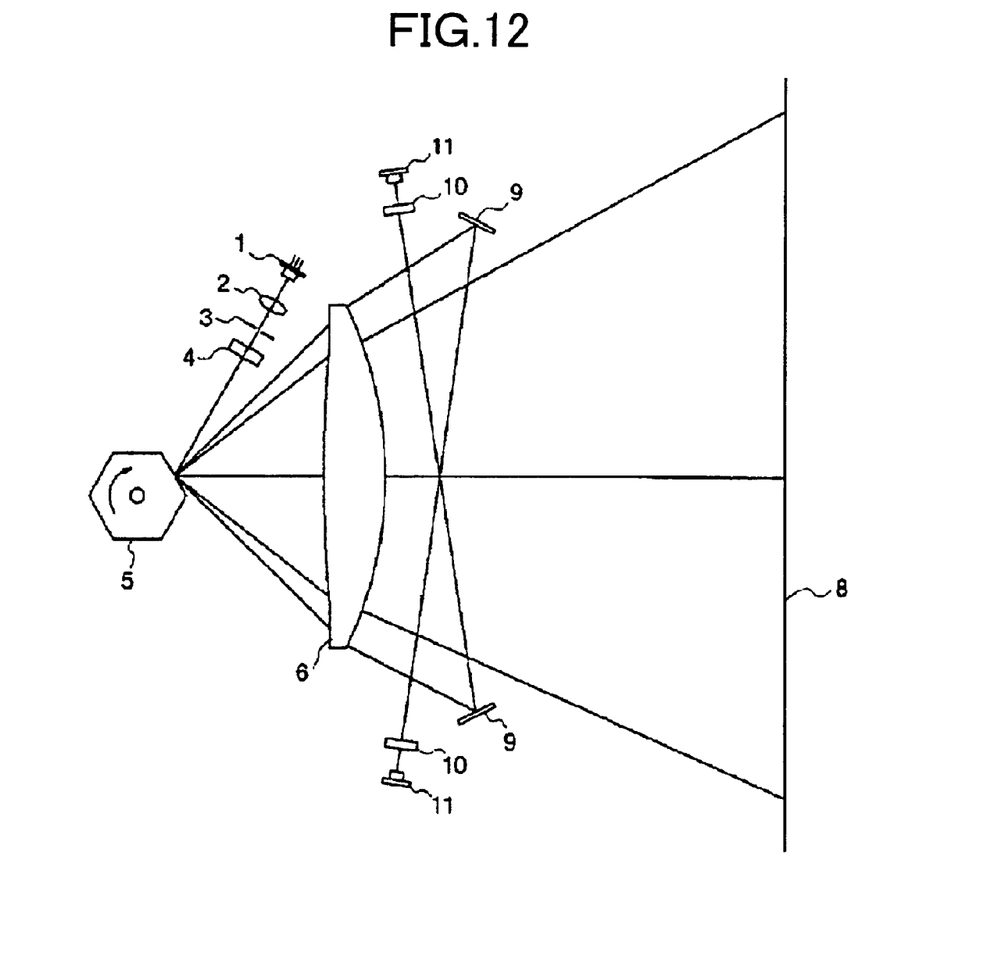
FIG. 12 is a plan view of an optical scanner according to still another embodiment of the present invention.

The light sources 1-1 and 1-2 may each be laser arrays that emit a plurality of light beams, whereby further increase in speed and density can be attained. Moreover, in the embodiments up to now, there has been only one synchronous detector, but there may be two synchronous detectors as shown in FIG. 12. In this case, it becomes possible to correct for fluctuations in the magnification factor in the main scanning direction. Moreover, in the embodiments described above, a constitution has been adopted in which there is one shynchronous lens, but a constitution in which there are a plurality of shynchronous lenses may be adopted.

Figure 13:
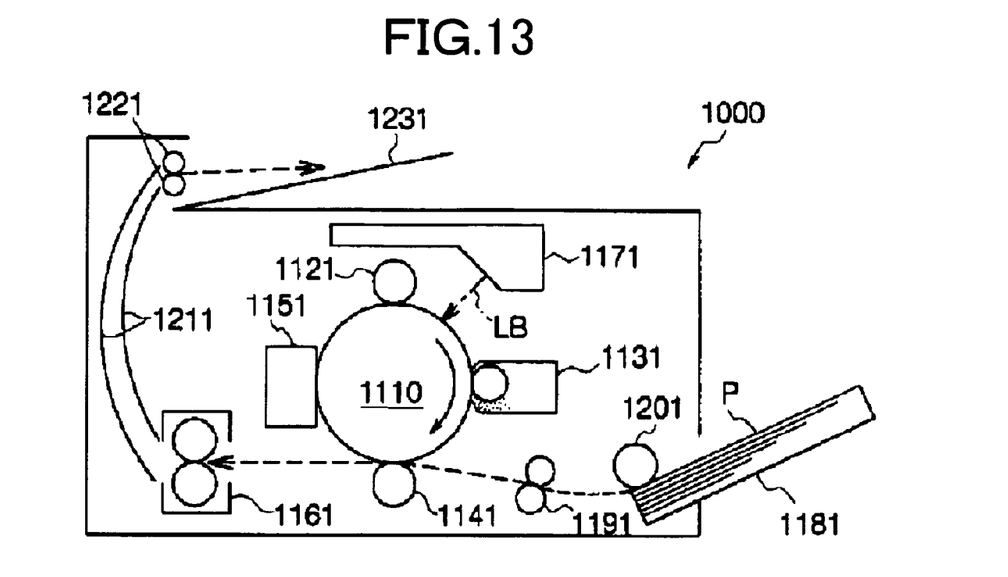
FIG. 13 is a schematic sectional view of a laser printer according to still another embodiment of the present invention.

A more detailed description will now be given, taking as an example the case in which a laser printer is used as the image forming apparatus. As illustrated in FIG. 13, a laser printer 1000 has a photoconductive photoreceptor formed into a cylindrical shape as a latent image carrier 1110. A charging roller 1121 as charging means, a developing apparatus 1131, a transferring roller 1141, and a cleaning apparatus 1151 are provided around the latent image carrier 1110. A corona charger can also be used as the charging means. Furthermore, an optical scanner 1171 that carries out optical scanning using a laser beam LB is provided, and the optical scanner 1171 carries out exposure by light writing between the charging roller 1121 and the developing apparatus 1131.

A reference numeral 1161 represents a fixing apparatus, reference numeral 1181 represents a cassette, reference numeral 1191 represents a pair of resist rollers, reference numeral 1201 represents a paper feeding roller, reference numeral 1211 represents a conveyance path, reference numeral 1221 represents a pair of paper discharging rollers, reference numeral 1231 represents a discharged paper tray, and reference numeral P represents transfer paper, which is a recording medium.

When carrying out image formation, the image carrier 1110, which is a photoconductive photoreceptor, is rotated clockwise at constant speed, and the surface thereof is charged uniformly by the charging roller 1121, and is subjected to exposure by light writing with the laser beam LB of the optical scanner 1171, thus forming an electrostatic latent image. The electrostatic latent image formed is a so-called negative latent image, with the image parts having been exposed. The electrostatic latent image is subjected to reversal developing by the developing apparatus 1131, whereby a toner image is formed on the latent image carrier 1110.

The cassette 1181, which stores the transfer paper P, is detachable from the main body of the image forming apparatus 1000; in the attached state shown in FIG. 13, the uppermost sheet of the stored transfer paper P is fed in by the paper feeding roller 1201, and the leading edge of the fed in transfer paper P is gripped by the pair of resist rollers 1191. The pair of resist rollers 1191 feed the transfer paper P to a transferring part with a timing matching that of the movement of the toner image on the latent image carrier 1110 to the transferring position. The fed in transfer paper P is placed over the toner image at the transferring part, and electrostatic transfer of the toner image onto the transfer paper P is carried out by the action of the transferring roller 1141. The transfer paper P onto which the toner image has been transferred is fed to the fixing apparatus 1161, where the toner image is fixed, passes along the conveyance path 1211, and is discharged into the discharged paper tray 1231 by the pair of paper discharging rollers 1221.

After the toner image has been transferred, the surface of the latent image carrier 1110 is cleaned by the cleaning apparatus 1151, whereby residual toner, paper dust and so on is removed. By using an optical scanner as described earlier as the optical scanner 1171, extremely good image formation can be carried out.

Figure 14:
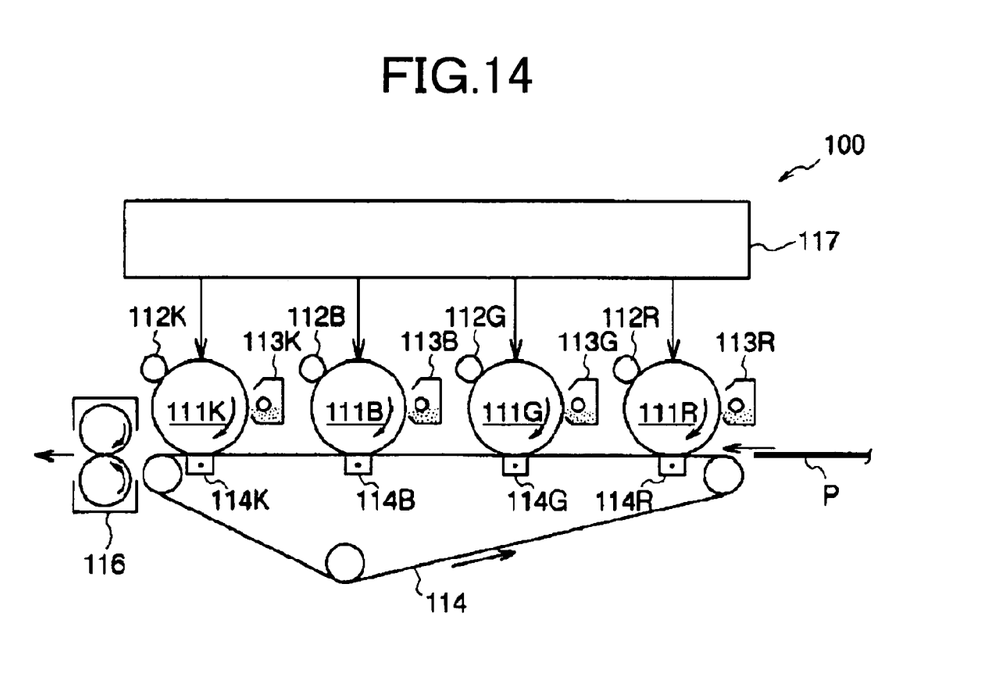
FIG. 14 is a schematic sectional view of a color laser printer according to still another embodiment of the present invention.

Next, a more detailed description will be given, taking as an example the case in which a color laser printer is used as the image forming apparatus. As illustrated in FIG. 14, the color laser printer 100 has photoconductive photoreceptors each formed into a cylindrical shape as photosensitive media 111R, 111G, 111B and 111K. A charging roller 112R (112G, 112B, 112K) as charging means, and a developing apparatus 113R (113G, 113B, 113K) are provided around the photosensitive medium 111R (111G, 111B, 111K). A transferring belt 114 common to the photosensitive media 111R, 111G, 111B and 111K is provided below the photosensitive media 111R, 111G, 111B and 111K, and corona chargers 114R, 114G, 114B and 114K for transfer are disposed along the inner perimeter of the transferring belt 114 at sites corresponding to the respective photosensitive media. An optical scanner 117 is provided above the photosensitive media 111R, 111G, 111B and 111K.

The optical scanner 117 can have a constitution, for example, in which one set of the embodiment shown in FIG. 10 is disposed so as to face the optical deflector, and the four light beams are guided onto the respective photosensitive media 111R, 111G, 111B and 111K. In FIG. 14, reference numeral 116 represents a fixing apparatus, and reference numeral P represents transfer paper, which is a recording medium.

When carrying out image formation, the photosensitive media 111R, 111G, 111B and 111K, which are photoconductive photoreceptors, are each rotated clockwise at constant speed, and the surfaces thereof are charged uniformly by the charging rollers 112R, 112G, 112B and 112K. The optical scanner 117 writes a red component latent image corresponding to a red component image onto the photosensitive medium 111R, and writes green, blue and black component latent images corresponding to green, blue and black component images onto the photosensitive media 111G, 111B and 111K respectively. The various color component latent images formed are so-called negative latent images, with the image parts having been exposed. The various color component latent images are subjected to reversal developing by the developing apparatuses 113R, 113G, 113B and 113K using red, green, blue and black toners respectively, whereby toner images of these colors are formed on the photosensitive media 111R, 111G, 111B and 111K. A sheet of the transfer paper P is conveyed by the transferring belt 114 to transferring positions corresponding to the various photosensitive media in order, and the red toner image is transferred from the photosensitive medium 111R, the green toner image from the photosensitive medium 111G, the blue toner image from the photosensitive medium 111B, and the black toner image from the photosensitive medium 111K, in this order by the corona chargers 114R, 114G, 114B and 114K for transfer.

A color image is formed as the composite image of the toner images of the various colors transferred in this way. The transfer paper P on which the color image has been formed in this way is fixed by the fixing apparatus 116, and is discharged out of the image forming apparatus. After the toner images have been transferred, the surface of each of the photosensitive media 111R, 111G, 111B and 111K is cleaned by a cleaning apparatus, not shown, whereby residual toner, paper dust and so is removed. Note that OHP sheets or the like may be used instead of the transfer paper P, and a constitution may be adopted in which the transfer of the toner images is carried out via an intermediate transferring medium such as an intermediate transferring belt.

As described above, according to the present invention, a shift in the position of a light beam spot corresponding to an error in the synchronous detector can be minimized.

Moreover, the size of the synchronous detector in the secondary scanning direction can be decreased, and hence compactness can be realized.

Moreover, the effects of an error in the installation of the shynchronous lens can be reduced.

Moreover, an optical scanner for which a shift in the position of a light beam spot corresponding to an error in the synchronous detector is minimized can be provided.

Moreover, a tandem type optical scanner for which a shift in the position of a light beam spot corresponding to an error in the synchronous detector is minimized can be provided.

Moreover, high speed and high density can be realized.

Moreover, an image forming apparatus for which a shift in the position of a light beam spot corresponding to an error in the synchronous detector is minimized can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A synchronous detector that detects timing of scanning by an optical scanner, the optical scanner has a light source that emits a light beam, a deflecting unit that deflects the light beam, a scanning optical element that focuses the light beam deflected by the deflecting unit onto a surface to be scanned, comprising:
    a synchronous optical element that focus the light beam deflected by the deflecting unit onto a photoreceiver, wherein the synchronous optical element satisfies a relationship fm<fd, where fm is a composite focal length of the scanning optical element in a main scanning direction of the scanning optical element, and fd is a composite focal length of the synchronous optical element in a main scanning direction of the synchronous optical element, wherein
    the synchronous detector comprises a plurality of the synchronous optical elements and a plurality of photoreceivers;
    the synchronous optical elements have negative power in the main scanning direction of the synchronous optical element.

2. The synchronous detector according to claim 1, wherein a plurality of laser beams travel toward the same synchronous detector, and the synchronous optical elements are arranged so as to focus principal rays of the light beams to a single point in a secondary scanning direction.

3. A synchronous detector that detects timing of scanning by an optical scanner, the optical scanner has a light source that emits a light beam, a deflecting unit that deflects the light beam, a scanning optical element that focuses the light beam deflected by the deflecting unit onto a surface to be scanned, comprising:
    a photoreceiver; and
    a synchronous optical element that focuses the light beam deflected by the deflecting unit onto the photoreceiver, wherein the synchronous optical element satisfies a relationship fm<fd, where fm is a composite focal length of the scanning optical element in a main scanning direction of the scanning optical element, and fd is a composite focal length of the synchronous optical element in a main scanning direction of the synchronous optical element, wherein
    the synchronous optical element is a single lens that is designed such that one surface thereof is a cylindrical surface that is concave in the main scanning direction, and the other surface thereof is a rotationally symmetric surface.

4. An optical scanner comprising:
    a light source that emits a light beam;
    a deflecting unit that deflects the light beam;
    a scanning optical element that focuses the light beam deflected by the deflecting unit onto a surface to be scanned; and
    a synchronous detector that detects timing of scanning by an optical scanner, the synchronous detector including
        a photoreceiver;
        a synchronous optical element that focus the light beam deflected by the deflecting unit onto the photoreceiver, wherein the synchronous optical element satisfies a relationship fm<fd, where fm is a composite focal length of the scanning optical element in a main scanning direction of the scanning optical element, and fd is a composite focal length of the synchronous optical element in a main scanning direction of the synchronous optical element; and
        a plurality of the synchronous optical elements and a plurality of photoreceivers, wherein the synchronous optical elements have negative power in the main scanning direction.

5. The optical scanner according to claim 4, wherein a plurality of laser beams travel toward the same synchronous detector, and the synchronous optical elements are arranged so as to focus principal rays of the light beams to a single point in a secondary scanning direction.

6. An optical scanner comprising:
    a light source that emits a light beam;
    a deflecting unit that deflects the light beam;
    a scanning optical element that focuses the light beam deflected by the deflecting unit onto a surface to be scanned; and
    a synchronous detector that detects timing of scanning by an optical scanner, the synchronous detector including
        a photoreceiver; and
        a synchronous optical element that focus the light beam deflected by the deflecting unit onto the photoreceiver, wherein the synchronous optical element satisfies a relationship fm<fd, where fm is a composite focal length of the scanning optical element in a main scanning direction of the scanning optical element, and fd is a composite focal length of the synchronous optical element in a main scanning direction of the synchronous optical element,
    wherein
    the synchronous optical element is a single lens that is designed such that one surface thereof is a cylindrical surface that is concave in the main scanning direction of the synchronous optical element, and the other surface thereof is a rotationally symmetric surface.

7. An image forming apparatus comprising a photoreceptor, an optical scanner that optically scans a surface of the photoreceptor, and a synchronous detector that detects timing of scanning of the photoreceptor by the optical scanner, wherein
    the optical scanner includes
        a light source that emits a light beam;
        a deflecting unit that deflects the light beam; and
        a scanning optical element that focuses the light beam deflected by the deflecting unit onto a surface to be scanned, and the synchronous detector includes
        a plurality of photoreceivers; and
        a plurality of synchronous optical elements
        wherein
            the synchronous optical elements focus the light beam deflected by the deflecting unit onto a photoreceiver, wherein a synchronous optical element satisfies a relationship fm<fd, where fm is a composite focal length of the scanning optical element in a main scanning direction of the scanning optical element, and fd is a composite focal length of the synchronous optical element in a main scanning direction of the synchronous optical element, and the synchronous detector comprises a plurality of the synchronous optical elements and a plurality of the photoreceivers, wherein the synchronous optical elements have negative power in the main scanning direction.

8. The image forming apparatus according to claim 7, wherein a plurality of laser beams travel toward the same synchronous detector, and the synchronous optical elements are arranged so as to focus principal rays of the light beams to a single point in a secondary scanning direction.

9. An image forming apparatus comprising a photoreceptor, an optical scanner that optically scans a surface of the photoreceptor, and a synchronous detector that detects timing of scanning of the photoreceptor by the optical scanner, wherein the optical scanner includes
a light source that emits a light beam;
a deflecting unit that deflects the light beam; and
a scanning optical element that focuses the light beam deflected by the deflecting unit onto a surface to be scanned, and the synchronous detector includes a photoreceiver; and a synchronous optical element that focus the light beam deflected by the deflecting unit onto the photoreceiver, wherein the synchronous optical element satisfies a relationship $fm<fd$, where $fm$ is a composite focal length of the scanning optical element in a main scanning direction of the scanning optical element, and fd is a composite focal length of the synchronous optical element in a main scanning direction of the synchronous optical element; and the synchronous optical element is a single lens that is designed such that one surface thereof is a cylindrical surface that is concave in the main scanning direction of the synchronous optical element, and the other surface thereof is a rotationally symmetric surface.

* * * * *